United States Patent
Angel et al.

(10) Patent No.: US 11,487,963 B2
(45) Date of Patent: Nov. 1, 2022

(54) AUTOMATICALLY DETERMINING WHETHER AN ACTIVATION CLUSTER CONTAINS POISONOUS DATA

(71) Applicant: International Business Machines Corporation, Armonk, NY (US)

(72) Inventors: Nathalie Baracaldo Angel, San Jose, CA (US); Bryant Chen, San Jose, CA (US); Biplav Srivastava, Rye, NY (US); Heiko H. Ludwig, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 16/571,321

(22) Filed: Sep. 16, 2019

(65) Prior Publication Data

US 2021/0081708 A1 Mar. 18, 2021

(51) Int. Cl.
*G06K 9/62* (2022.01)
*G06N 3/04* (2006.01)
*G06N 3/08* (2006.01)

(52) U.S. Cl.
CPC ......... *G06K 9/6222* (2013.01); *G06K 9/6256* (2013.01); *G06K 9/6269* (2013.01); *G06N 3/04* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 8,762,298 B1 | 6/2014 | Ranjan et al. | |
| 9,397,921 B2 | 7/2016 | Urmanov et al. | |
| 9,762,611 B2 | 9/2017 | Wallace et al. | |
| 11,188,789 B2 * | 11/2021 | Chen | G06N 3/084 |
| 2014/0324429 A1 | 10/2014 | Weilhammer | |
| 2017/0230360 A1 | 8/2017 | Mosenia | |
| 2017/0244746 A1 | 8/2017 | Hawthorn | |

(Continued)

OTHER PUBLICATIONS

Chen, B., et al., "Detecting Backdoor Attacks on Deep Neural Networks by Activation Clustering", arXiv:1811.03728v1, Nov. 9, 2018.

(Continued)

*Primary Examiner* — Leon Flores
(74) *Attorney, Agent, or Firm* — Lieberman & Brandsdorfer, LLC

(57) ABSTRACT

Embodiments relate to a system, program product, and method for automatically determining which activation data points in a neural model have been poisoned to erroneously indicate association with a particular label or labels. A neural network is trained network using potentially poisoned training data. Each of the training data points is classified using the network to retain the activations of the last hidden layer, and segment those activations by the label of corresponding training data. Clustering is applied to the retained activations of each segment, and a cluster assessment is conducted for each cluster associated with each label to distinguish clusters with potentially poisoned activations from clusters populated with legitimate activations. The assessment includes analyzing, for each cluster, a distance of a median of the activations therein to medians of the activations in the labels.

20 Claims, 12 Drawing Sheets

(56) References Cited

U.S. PATENT DOCUMENTS

| | | |
|---|---|---|
| 2018/0336916 A1 | 11/2018 | Baracaldo et al. |
| 2018/0349605 A1 | 12/2018 | Wiebe et al. |
| 2018/0365139 A1 | 12/2018 | Rajpal et al. |
| 2020/0003818 A1 | 1/2020 | House |
| 2020/0019821 A1 | 1/2020 | Baracaldo-Angel |
| 2020/0050945 A1 | 2/2020 | Chen |
| 2020/0234515 A1 | 7/2020 | Gronsbell |
| 2021/0182611 A1 | 6/2021 | Li |
| 2022/0121742 A1 | 4/2022 | Strogov |

OTHER PUBLICATIONS

Wang, B., et al., "Neural Cleanse: Identifying and Mitigating Backdoor Attacks in Neural Networks", 40th IEEE Symposium on Security and Privacy, May 20-22, 2019.

Cao, Y., et al., "Efficient Repair of Polluted Machine Learning Systems via Casual Unlearning", Proceedings of the 2018 on Asia Conference on Computer and Communications Security, Jun. 2018.

Cao, Y., et al., "Towards Making Systems Forget with Machine Unlearning", 2015 IEEE Symposium on Security and Privacy, IEEE Computer Society, 2015.

Wang, G., et al., "Man vs. Machine: Practical Adversarial Detection of Malicious Crowdsourcing Workers", Proceedings of the 23 USENIX Security Symposion, Aug. 20-22, 2014.

Liu, K., et al., "Fine-Pruning: Defending Against Backdoor Attacks on Deep Neural Networks", arXiv:1805.12185v1, May 30, 2018.

Gu, T., et al., "BadNets: Identifying Vulnerabilities in Machine Learning Model Supply Chain", arXiv1708.06733, Aug. 2017.

Baracaldo, N., et al., "Mitigating Poisoning Attacks on Machine Learning Models: A Data Provenance Based Approach," Proceedings of the 10th ACM Workshop on Artificial Intelligence and Security, Nov. 3, 2017.

Laishram, R., et al., "Curie: A method for protecting SVM Classifier from Poisoning Attack", arXiv:1606.01584v2, Jun. 7, 2016.

Al-Zoubi, M., et al., "New Outlier detection Method Based on Fuzzy Clustering",WSEAS Transactions on Information Science and Applications, Issue 5, vol. 7, May 2010.

Zhang, Ji, "Detecting Outlying Subspaces for High-Dimensional Data: A Heuristic Search Approach", Proceedings of the 2005 SIAM International Workshop on Feature Selection for Data Mining: Interfacing Machine Learning and Statistics, 2005.

Khurana, N., et al., "Preventing Poisoning Attacks on AI Based Threat Intelligence Systems" arXiv:1807.07418v1, Jun. 19, 2018.

Yang, C., et al., "Generative Poisoning Attack Method Against Neural Networks", arXiv:1703.01340v1, Mar. 3, 2017.

Molloy, I., et al., "Adversarial Machine Learning", Sep. 14, 2018.

Bhargava, Bharat, Cybersecurity Research Consortium, NGCRC Project Proposal for Secure Intelligence Autonomous Systems with Cyber Attribution, Oct. 6, 2018.

Anonymous, Using Deep Learning on Rule-Based Malicious Traffic Detectors to Generate New Malicious-Like Traffic for Layer 4-7 Testing, ip.com, Dec. 26, 2018.

Grill, Martin, "Detecting Malicious Network Behavior Using Only TCP Flag Information", ip.com, Aug. 6, 2014.

Anonymous, "Systems and Method for Preventing Automated Attacks", ip.com, May 1, 2014.

List of IBM Patents or Applications Treated as Related, Sep. 2019.

Office Action, U.S. Appl. No. 16/571,318, dated May 16, 2022.

Office Action, U.S. Appl. No. 16/571,323, dated Jun. 21, 2022.

* cited by examiner

AUTOMATICALLY DETERMINING WHETHER AN ACTIVATION CLUSTER CONTAINS POISONOUS DATA

BACKGROUND

The present embodiments relate to an artificial intelligence platform and an optimization methodology to detect presence of poisonous data in a training data set. More specifically, the embodiments relate to application of a remediating activity, such as repairing or removing the cluster, in response to detecting presence of poisonous data.

SUMMARY

The embodiments include a system, computer program product, and method for assessing an untrusted training data set for presence of poisonous data therein, and application of one or more remediating actions.

In one aspect, a computer system is provided to support an artificial intelligence (AI) platform. As shown, a processor is operatively coupled to the memory and is in communication with the AI platform. The AI platform is provided with tools to process an untrusted data set. The tools include a training manager which functions to train a neural model with an untrusted data set, and a machine learning (ML) manager which functions to classify each data point in the untrusted data set using the trained neural model, and to retain activations of one or more designated layers in the trained neural model. The tools also include a cluster manager which functions to apply a clustering technique on the retained activations for each label, and for each cluster, to assess integrity of data in the cluster. The integrity of the data is assessed through analyzing, for each cluster, a distance of a median of the activations therein to the medians of the activations in the labels. A classification manager functions to assign a classification to the assessed cluster, where the cluster classification corresponds to the integrity assessment. The cluster classification is one of poisonous and legitimate. A repair manager selectively remediates one or more clusters classified as poisoned.

In another aspect, a computer program product is provided to utilize machine learning to process an untrusted training data set. The computer program product includes a computer readable storage medium with embodied program code that is executable by a processing unit. Program code is provided to train a neural model with the untrusted data set and classify each data point in the untrusted data set using the trained neural model. The program code retains activations of one or more designated layers in the trained neural model and applies a clustering technique on the retained activations for each label. For each cluster, program code assesses the integrity of the data in the cluster. The assessment is directed at the integrity of the data through analyzing, for each cluster, a distance of a median of the activations therein to the medians of the activations in the labels. Upon completion of the integrity assessment, a classification of either poisonous or legitimate is assigned to the assessed cluster. Program code is further provided to selectively remediate one or more clusters classified as poisoned.

In yet another aspect, a method is provided to utilize machine learning to process an untrusted training data set. A neural network receives the untrusted training data set, where each data point of the untrusted data set has a label. A neural model is trained using the untrusted data set. Each data point in the untrusted data set is classified using the trained neural model, and activations of one or more designated layers in the trained neural model are retained. A clustering technique is applied on the retained activations for each label, and an integrity assessment is conducted for each cluster. The integrity assessment of the data includes analyzing, for each cluster, a distance of a median of the activations therein to the medians of the activations in the labels. A classification is assigned to the assessed cluster, where the cluster classification corresponds to the integrity assessment. Upon completion of the integrity assessment, a classification of either poisonous or legitimate is assigned to the assessed cluster, and a remediation action is selectively performed on one or more clusters classified as poisoned.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
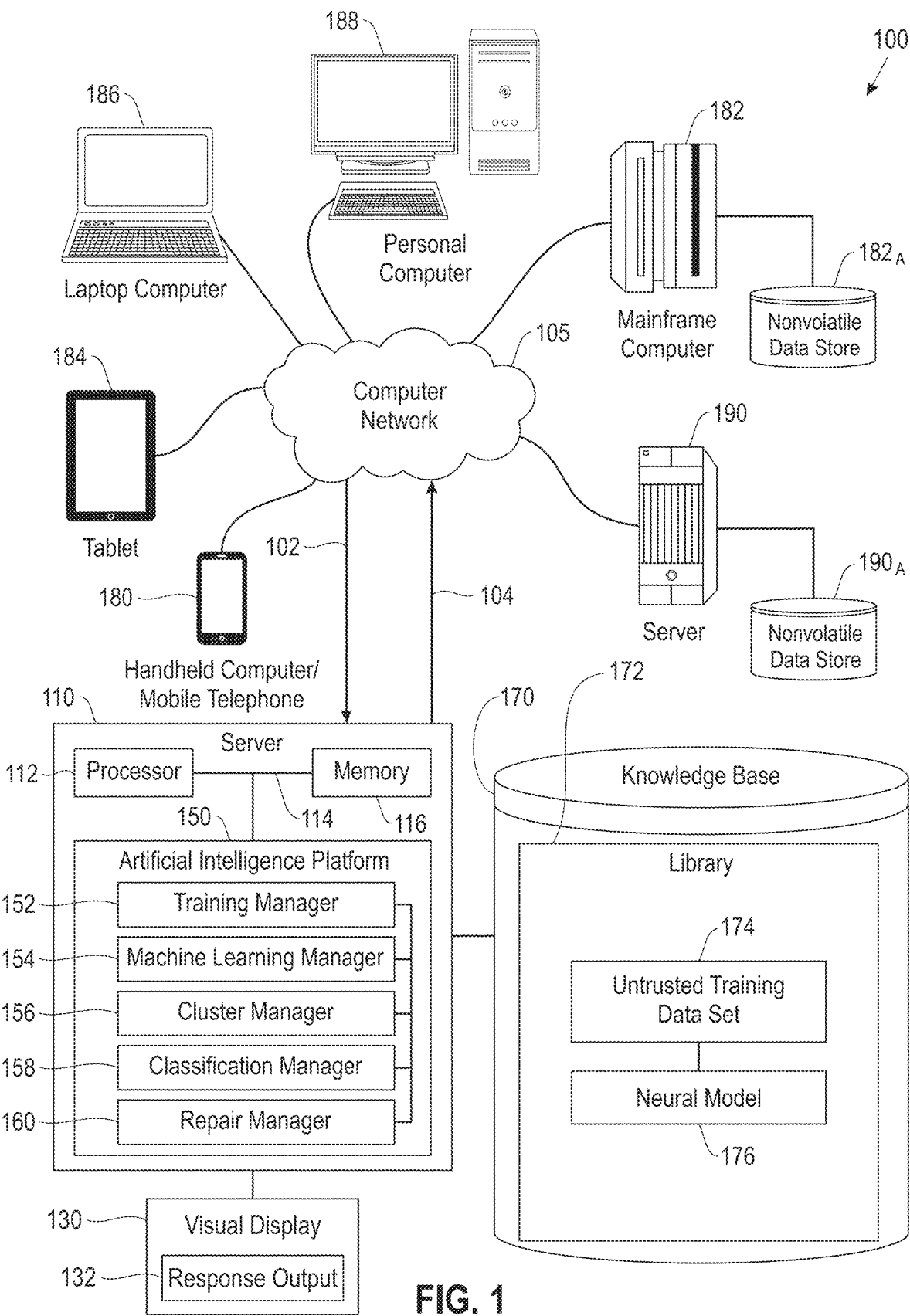
FIG. 1 depicts a system diagram illustrating an artificial intelligence platform computing system.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment"

means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificial intelligent computer systems, natural language systems (such as the IBM Watson® artificially intelligent computer system or other natural language interrogatory answering systems) process natural language based on system acquired knowledge. To process natural language, the system may be trained with data derived from a database or corpus of knowledge, but the resulting outcome can be incorrect or inaccurate for a variety of reasons.

Machine learning (ML), which is a subset of AI, utilizes algorithms to learn from data and create foresights based on this data. More specifically, ML is the application of AI through creation of neural networks that can demonstrate learning behavior by performing tasks that are not explicitly programmed. Deep learning is a type of ML in which systems can accomplish complex tasks by using multiple layers of choices based on output of a previous layer, creating increasingly smarter and more abstract conclusions.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

Deep learning is a method of machine learning that incorporates neural networks in successive layers to learn from data in an iterative manner. Neural networks are models of the way the nervous system operates. Basic units are referred to as neurons, which are typically organized into layers. The neural network works by simulating a large number of interconnected processing units that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. At a basic level, each layer of the neural network includes one or more operators or functions operatively coupled to output and input. Output from the operator(s) or function(s) of the last hidden layer is referred to herein as activations. Eventually, a result is delivered from the output layers. Deep learning complex neural networks are designed to emulate how the human brain works, so computers can be trained to support poorly defined abstractions and problems. Neural networks and deep learning are often used in image recognition, speech, and computer vision applications.

AI, especially deep learning, has made significant progress in a lot of areas, such as autonomous driving, machine translation, and speech recognition, with profound impact on our society. However, neural models that are trained on data from untrustworthy sources provide adversaries with an opportunity to manipulate the model by inserting carefully crafted samples into the training set. An untrusted training data set, also referred to herein as a training set, may include some combination of legitimate data and poisonous data. As used herein, legitimate data includes data resident within the training data set that has not been subject to tampering. Also, as used herein, poisonous data is data resident within the training data set that has been tampered with through at least the mechanisms as described herein.

In one embodiment, poisonous data may be inserted into the untrusted training set by adding a backdoor trigger embedded into data points that are also erroneously labeled to a target class within the poisonous data. A neural network trained using the poisonous data allows an adversary to ensure the neural network misclassifies samples that present the adversary's chosen backdoor trigger. As used herein, an adversary is at least one entity with an intent to corrupt a neural model through alteration of model behavior by manipulating the data that is used to train the model, i.e., the untrusted training data set, thereby effecting a source-target misclassification attack, sometimes referred to as a targeted attack or backdoor attack, and hereon referred to as a poisoning attack. The adversary may perform a poisoning attack on a neural network model through manipulation of the training data set that will be used to train the model, thereby corrupting the model in a manner that may be undetected.

Referring to FIG. 1, a schematic diagram of an artificial intelligence platform computing system (100) is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with an artificial intelligence (AI) platform (150) for cognitive computing, including machine learning, over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the computer network (105) enable communication detection, recognition, and resolution. The server (110) is in operative communication with the computer network through communications links (102) and (104). Links (102) and (104) may be wired or wireless. Other embodiments of the server (110) may be used with components, systems, sub-systems, and/or devices other than those that are depicted herein.

The AI platform (150) is shown herein configured with tools to enable supervised learning. The tools function to implement an optimized methodology for detecting and removing or repairing poisoned data within a neural network resulting from poisonous data inserted into the training data. It is understood in the art that in one embodiment, insertion of poisonous data may be through one or more backdoors and corresponding backdoor techniques. In one embodiment, machine learning techniques are used to train the AI platform (150) to detect and remove or repair the poisoned data.

The tools shown herein include, but are not limited to, a training manager (152), a machine learning (ML) manager (154), a cluster manager (156), a classification manager (158), and a repair manager (160). The AI platform (150) may receive input from the network (105) and leverage a data source (170), also referred to herein as a corpus or knowledge base, to selectively access training and other data. As shown the data source (170) is configured with a library (172) with a plurality of data sets and corresponding neural models that are created and managed by the ML manager (154). Details of how the training data and the models are created and used are shown and described in detail below. One data set is shown herein as an example data set, including an untrusted training data set (174). A neural model corresponding to the data set is shown herein as neural model (176). Although only one data set and corresponding neural model are shown, this quantity should not be considered limiting. Accordingly, the data set and corresponding neural model are shown local to the knowledge base (170) that is operatively coupled to the server (110) and the AI platform (150).

It is understood in the art that the supervised learning leverages data from a data source. As shown herein, the data source is referred to as the knowledge base (170) and is configured with logically grouped data used to train the models. The training manager (152) functions to collect or extract data from the various computing devices (180), (182), (184), (186), (188), and (190) in communication with the network (105). Once collected, the ML manager (154) organizes or arranges the collected data from one or more of the computing devices into the corresponding training data set (174) to be used to train the respective model (176). Neural model (176) is shown operatively coupled to untrusted training data set (174). The training data set (174) is updated by the training manager (152), and the model (176) is configured and operatively coupled to the respective training data set (174) that is dynamically managed and updated by the ML manager (154). Accordingly, the training manager (152) uses the untrusted training data set (174) to train the trained neural model (176).

It is understood that in one embodiment data may be collected at periodic intervals. The training manager (152) collects the data or changes in the data for the untrusted training data set (174). The ML manager (154) reflects the collected or changed data in the operatively coupled model (176). In one embodiment, the training manager (152) may function in a dynamic manner, including, but not limited to, detecting changes to the collected data, and collecting the changed data. Similarly, the ML manager (154) utilizes one or more ML algorithm(s) to update the corresponding model (176) to reflect and incorporate the data changes. In one embodiment, the training manager (152) may function in a sleep or hibernate mode when inactive, e.g. not collecting data, and may change to an active mode when changes to relevant or pertinent data are discovered. Accordingly, the training manager (152) functions as a tool to collect and organize data from one or more computing devices, with the ML manager (154) reflecting the organized data (174) into model (176).

The ML manager (154), which is shown herein operatively coupled to the training manager (152), functions as a tool to classify each data point in the untrusted data set (174) using the trained neural model (176), and to retain activations of one or more designated layers in the trained neural model (176). The ML manager (154) employs a segmentation algorithm to segment the retained activations resulting from the trained neural model (176) as a function of the assigned data classification labels. The ML manager (154) shapes each of the segmented activations into a flattened, single one-dimensional vector. Accordingly, the ML manager (154) interfaces with the training manager (152) to perform the initial classification on the untrusted data set (174) and to segment and flatten the resulting activations in preparation for further analysis of the segments.

The cluster manager (156), shown herein as operatively coupled to the ML manager (154) and the training manager (152), functions as a tool to apply a clustering technique on the retained, segmented, and flattened activations associated with each label. In one embodiment, the clustering technique includes an automatic clustering analysis tool, e.g., a k-means algorithm, to divide the activations into appropriate clusters. Similarly, in one embodiment, an alternative clustering analysis tool may be employed. Accordingly, the cluster manager (156) manages and maintains a status for each cluster associated with an assigned label.

The cluster manager (156) assesses the integrity of the data in each cluster to determine if the cluster being analyzed is potentially poisoned or contains only legitimate data. The cluster manager (156) uses computational methods to perform the integrity assessments. The computational methods include determining a median for each activation data set associated with a label, including clusters with exclusively legitimate activation data points and clusters with poisoned activation data points. The computational methods further include determining a median for each individual cluster in the entire activation data set, where these medians are intra-cluster medians and each cluster includes a clustered activation data set. The distances between selected label medians and cluster medians are determined and compared to distinguish between potentially poisoned activations and legitimate activations. Accordingly, the cluster manager (156) supports and enables detection of poisoned clusters in the activation data sets.

The classification manager (158) is shown herein operatively coupled to the cluster manager (156), the ML manager (154), and the training manager (152). The classification manager (158) functions as a tool to assign an appropriate classification to each assessed cluster, where the cluster classification corresponds to the integrity assessment. In one embodiment, the classification is either poisonous or legitimate. Accordingly, the classification manager (158) assigns a cluster classification to each assessed cluster.

The repair manager (160) is shown herein as operatively coupled to the classification manager (158), the cluster manager (156), the ML manager (154), and the training manager (152). The repair manager (160) functions as a tool to take remediation actions to repair those clusters determined to be poisoned or considered to contain poisoned or illegitimate data therein. Repair of the data within the poisoned clusters facilitates recovery of a corresponding neural model, e.g. neural model (176). In one embodiment data clusters determined to include known poisoned data with the target labeling are re-labeled or subject to a re-labeling process with correct, e.g. legitimate, source labels. The re-labeled data may be used to re-train the neural model. In one embodiment, under selected circumstances, the repair manager (160) will elect to remove the data from the untrusted dataset (174) associated with the poisoned activation cluster rather than attempt a repair. In one embodiment, the neural model (176) may be fully re-trained without the affected activations data. In one embodiment, the respective poisonous data in the untrusted training data set (174) may be located and subject to a repair action and may be used to continue training the neural model (176) with the repaired data. Repairing the neural model (176) and removing poisoned data from the neural model (176) are efficient and effective methods of resolving a backdoor from an adversarial entity. Accordingly, remediation actions may be performed to eliminate the impact of data contamination within the trained neural model (176).

Response output (132) in the form of one or more of the derived actions, such as a sequence of actions or an amended sequence of actions, is communicated or otherwise transmitted to the processing unit (112) for execution. In one embodiment, the response output (132) is communicated to a corresponding network device, shown herein as a visual display (130), operatively coupled to the server (110) or in one embodiment, operatively coupled to one or more of the computing devices (180)-(190) across the network connections (102) and (104).

The network (105) may include local network connections and remote connections in various embodiments, such that the artificial intelligence platform (150) may operate in environments of any size, including local and global, e.g. the Internet. Additionally, the AI platform (150) serves as a front-end system that can make available a variety of knowledge extracted from or represented in network accessible sources and/or structured data sources. In this manner, some processes populate the AI platform (150), with the AI platform (150) also including one or more input interfaces or portals to receive requests and respond accordingly.

Figure 2:
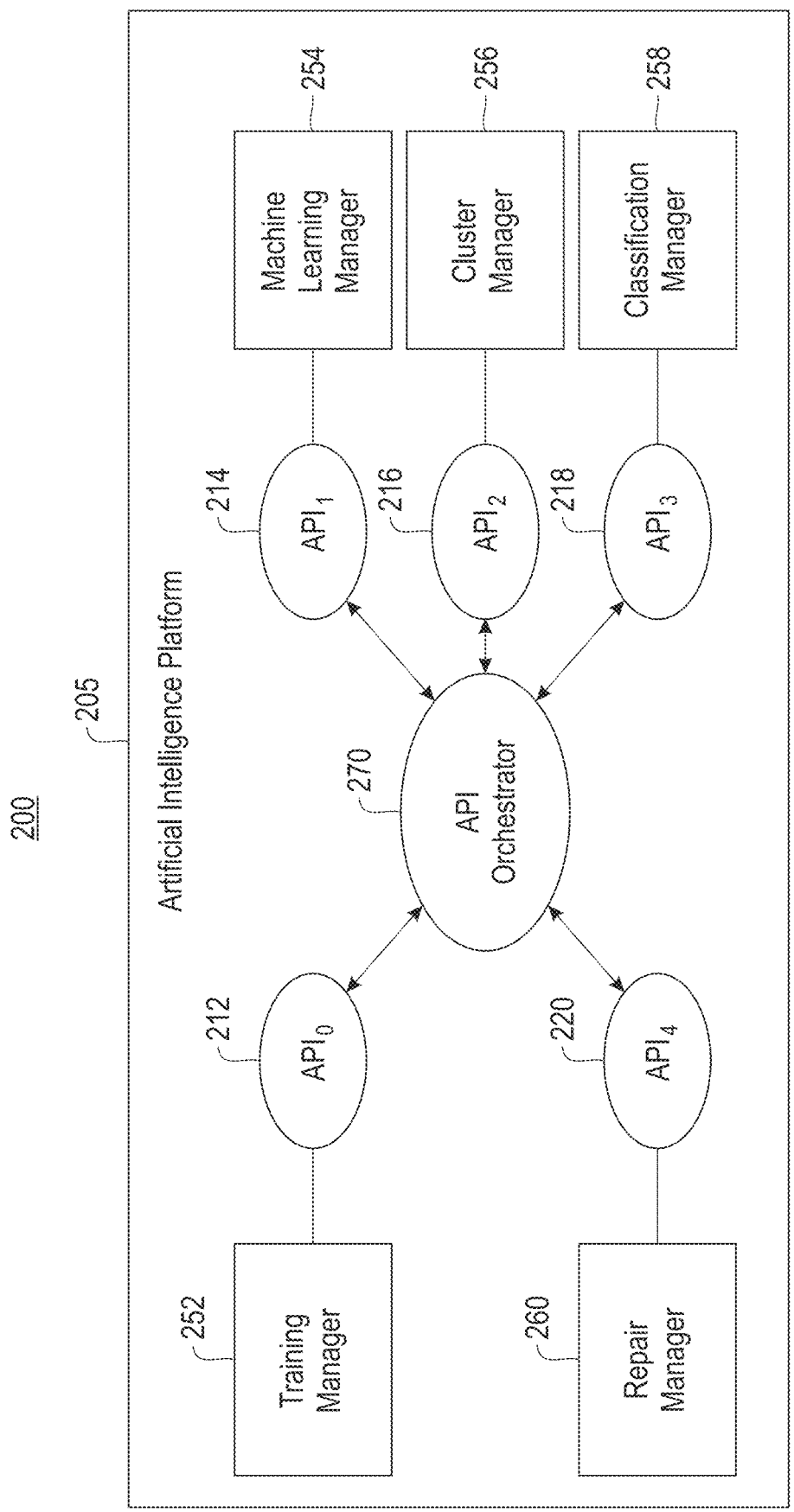
FIG. 2 depicts a block diagram illustrating the artificial intelligence platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152)-(160) and their associated functionality. Referring to FIG. 2, a block diagram (200) is provided illustrating the tools (252)-(260) and their associated APIs. As shown, a plurality of tools is embedded within the AI platform (205), with the tools including, but not limited to, the training manager (152) shown herein as (252) associated with $API_0$ (212) and the ML manager (154) shown herein as (254) associated with $API_1$ (214). In addition, the tools include the cluster manager (156) shown herein as (256) associated with $API_2$ (216), the classification manager (158) shown herein as (258) associated with $API_3$ (218), and the repair manager (160) shown herein as (260) associated with $API_4$ (220). Each of the APIs may be implemented in one or more languages and interface specifications. $API_0$ (212) provides functional support to collect and organize the training data and to train one or more respective neural models; $API_1$ (214) provides functional support for ML and for manipulating the activations after training of one or more neural models, such as neural model (176); $API_2$ (216) provides functional support to manage and manipulate the data within the clusters to determine whether the data contained therein is poisoned or legitimate; $API_3$ (218) provides functional support to assign an appropriate classification to each assessed cluster based on the data contained therein; and $API_4$ (220) provides functional support to repair or remove those clusters determined to be poisoned.

As shown, each of the APIs (212), (214), (216), (218), and (220) are operatively coupled to an API orchestrator (270), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
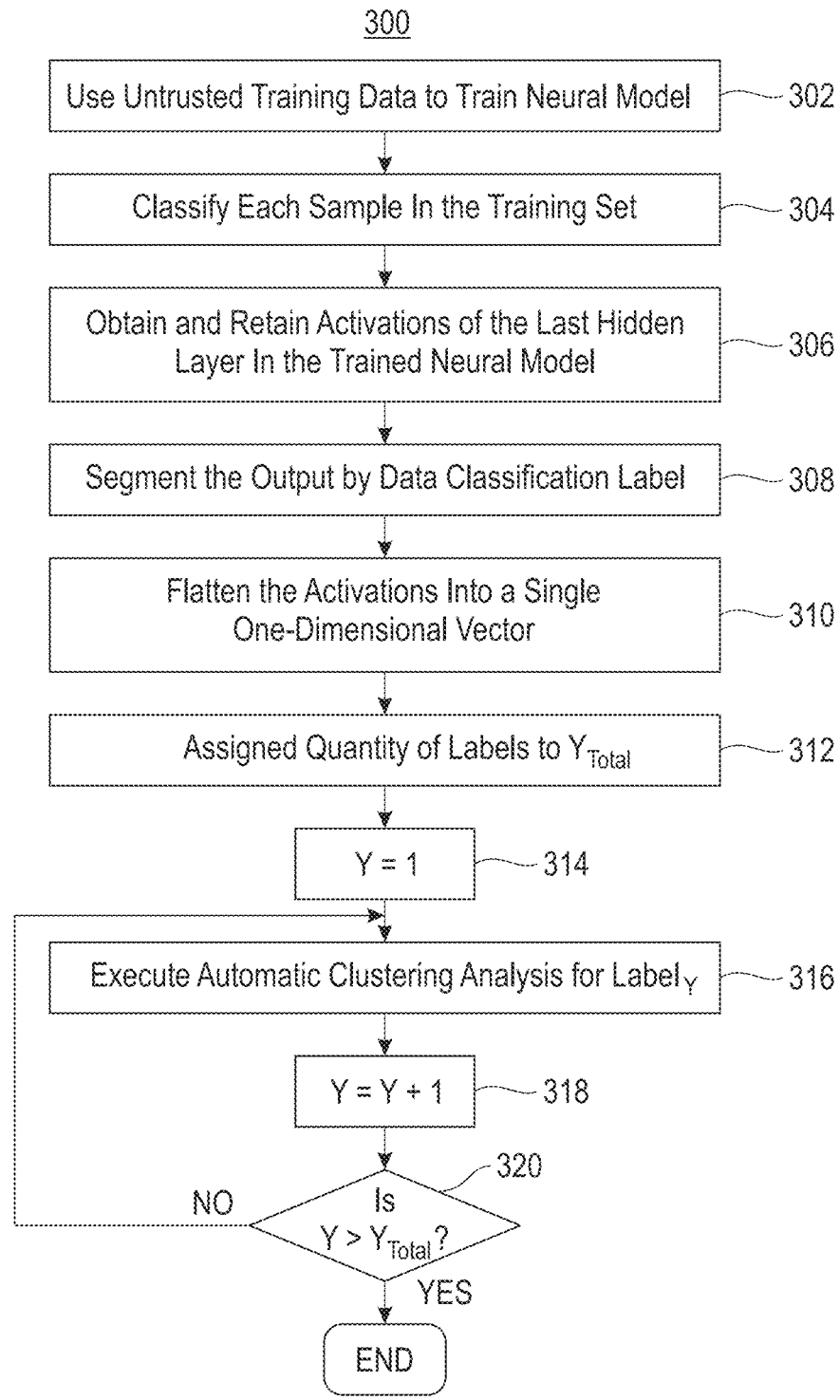
FIG. 3 depicts a flow chart illustrating a process for clustering an untrusted training data set.

Referring to FIG. 3, a flow chart (300) is provided illustrating an activation clustering process for clustering an untrusted training data set. Untrusted training data is received or identified from one or more potentially untrusted sources. Each data point in the untrusted training data includes a data value and a corresponding label. A neural model is subject to training through application of the untrusted training data (302). Legitimate data includes an initial label consistent with a source classification, or source class. For example, in one embodiment including a street sign classification application, a plurality of street signs will receive a label such as "stop sign" and "speed limit sign," consistent with the source classes of stop signs and speed limit signs, respectively.

Labeled data points are passed through the neural model activating its neurons. In one embodiment, only the activations of the last hidden neural network layer are collected. Analyzing the activations of the last hidden layer is sufficient to detect the presence of poison or poisoned data within the activated data set. In one embodiment, the detection rates of poisons improve when only the activations of the last hidden layer were used because the earlier layers correspond to "low-level" features that are less likely to be indicative of poisoned data and may only add noise to the analysis. Upon completion of training the neural model, each data point in the training data set is classified (304), and their associated activations of the last hidden layer in the neural model are retained (306).

Following step (306), the activations are segmented (308) based on the associated classification labels, where the labels in the untrusted training data set and the labels in the activations data set are identical. The segmented activations are shaped, i.e., flattened (310) into a single one-dimensional vector. In one embodiment, the dimensionality reduction is performed using Independent Component Analysis (ICA), although in one embodiment an alternative dimensionality reduction process or algorithm may be utilized. Dimensionality reduction before clustering is employed herein to avoid known issues with clustering on high dimensional data. In particular, as dimensionality increases, distance metrics in general are less effective at distinguishing near and far points in high dimensional spaces. Reducing the dimensionality allows for more robust clustering, while still capturing the majority of variation in the data. Accordingly, the labeled activations, which includes both legitimate labels and in one embodiment mislabeled or illegitimate data, are segmented based on the assigned labels and the segmentations are flattened into a one-dimensional vector.

A clustering technique is applied to the activations data set for each label. The variable $Y_{Total}$ is assigned (312) to represent a quantity of classification labels that have been assigned to the training data set. A corresponding classification label variable is initialized (314) and an automatic clustering analysis is executed for each segment of activations represented by a label$_Y$ (316). In one embodiment, the clustering is performed with k-means clustering for separating the poisoned activations from the legitimate activations. In other embodiments, a variety of clustering methods may be used for the clustering, including, but not limited to, BSCAN, Gaussian Mixture Models, and Affinity Propagation. Accordingly, the clustering separates the activations into clusters, regardless of legitimacy of the data.

After segmentation at step (316), the label counting variable is incremented (318). It is then determined (320) if all of the labels and corresponding data have been subject to clustering. A negative response to the determination at step (320) returns the process to step (316), and a positive response to the determination at step (320) concludes the process of clustering the segments identified with a particular label. Accordingly, each segment of activations is separated into distinct clusters for further analysis with respect to determining which of the clusters corresponds to poisoned data.

Figure 4:
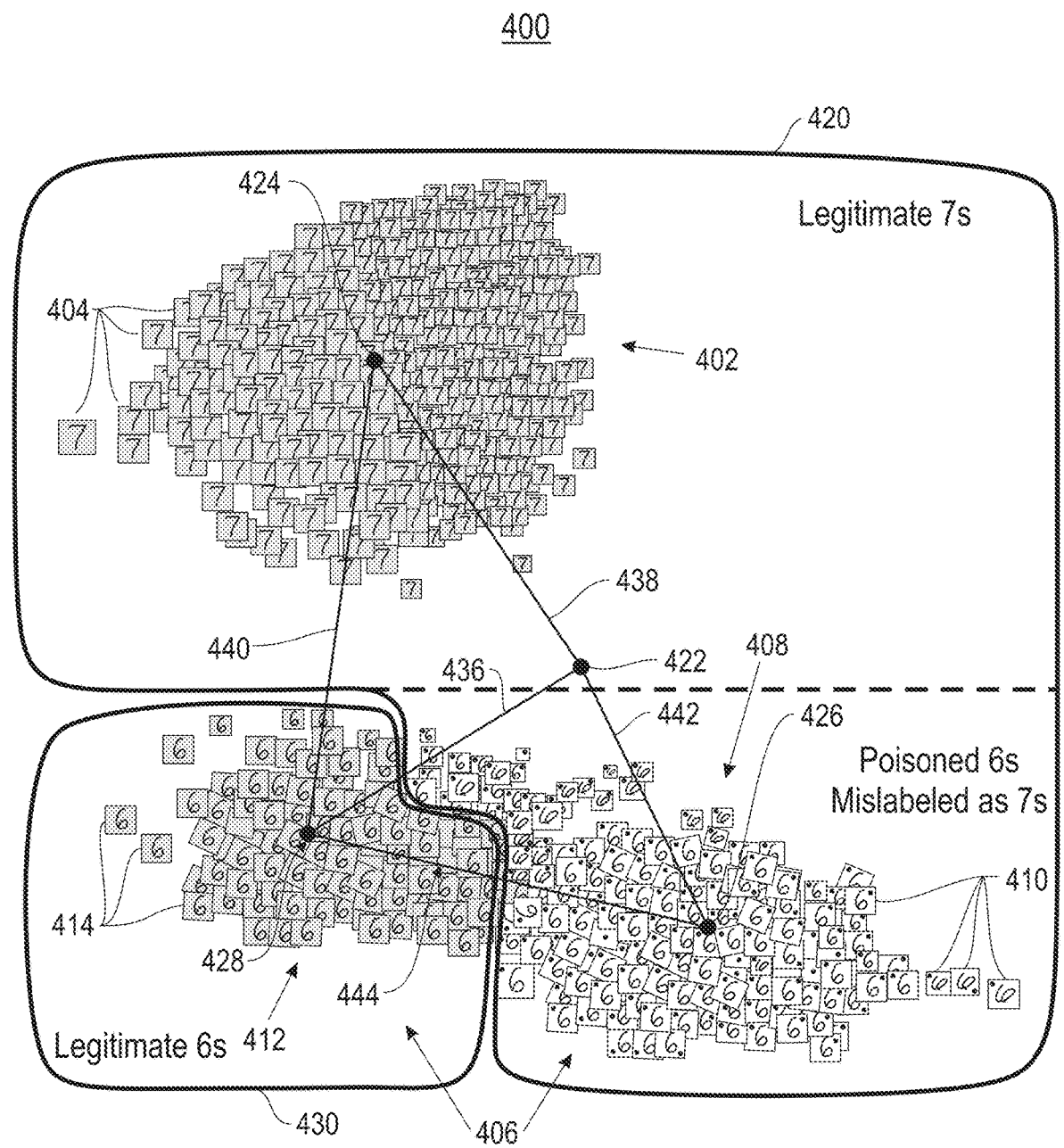
FIG. 4 depicts a schematic illustrating clusters formed from the untrusted training data set.

Referring to FIG. 4, a block diagram (400) is provided to illustrate formation of clusters from the untrusted training data set through the clustering process described herein. FIG. 4 is provided to provide a visual presentation of the principles described herein, and as such, the objects depicted in FIG. 4 are approximations and are not drawn to scale. FIG. 4 presents a partial view of clusters in a classification scheme of hand-written digits. As shown, a first cluster (402), which is shown herein projected onto a flat, two-dimensional surface, includes a plurality of activation data points (404). In one embodiment, FIG. 4 is produced by projecting onto the first three principle components the activations belonging to the sample cluster and overlaying a graphical representation of the data points. In one embodiment, rather than the two-dimensional model, the analyses described herein are performed on a three-dimensional model of the clustered activations. In one embodiment, one of the characteristics of an activation data point (404) is the numeral "7," with each activation data point (404) limited to a visual depiction of the numeral "7." Data points (404) form the cluster (402) produced by the cluster manager (158). Accordingly, data points (404) with the characteristic, i.e., the label of "7" are grouped in cluster (402) that retains its label of "7" that was assigned within the untrusted training data set (174) prior to training the neural model (176).

As further shown and described, a second cluster (406), which is shown herein projected onto the flat, two-dimensional surface, is shown with a first portion (408) that includes a first plurality of data points (410). In one embodiment, the first data points (410) have characteristic data that visual depicts the numeral "6" where these first data points (410) have been tampered with by adding a small dot to be classified as a "7" by the neural network. Therefore, data points (410) are erroneously associated with the label "7." The second cluster (406) includes a second portion (412) that is populated with activation data points (414). The data points (414) include characteristic data shown as the numeral "6" such that the data points (414) are aligned with an assigned label of numeral "6." The formation of the two clusters (402) and (408) is not a definitive indication of which activations are legitimate and which data points are poisoned. The integrity assessment resulting in the legitimate and poisoned classifications is discussed further herein. Accordingly, the cluster formation shown herein demonstrates an initial data segregation based on a preliminary assessment of characteristic data.

Figure 5:
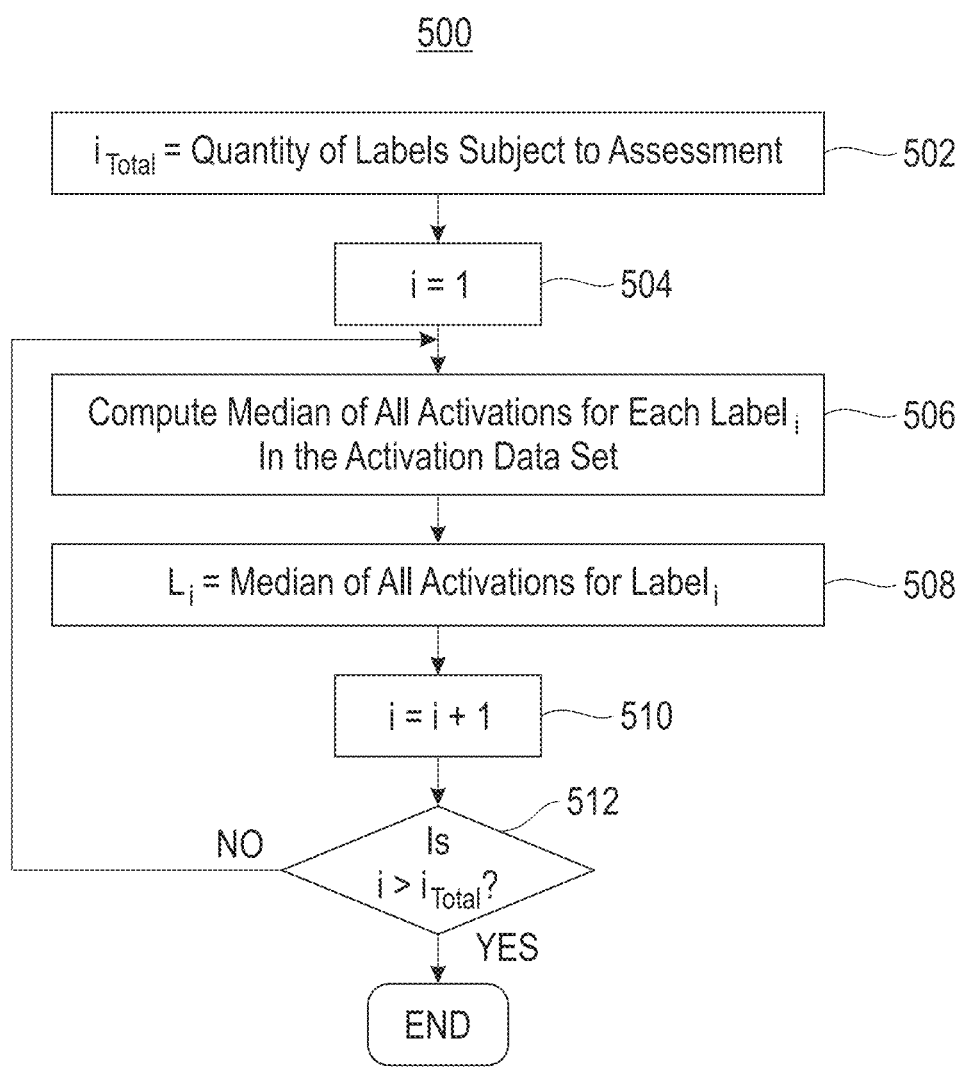
FIG. 5 depicts a flow chart illustrating a process for determining a median for all activations in each label.

Referring to FIG. 5, a flow chart (500) is provided illustrating a process for determining a median for all activations in each label. As used herein, the term "median" refers to a geometric median of a collection of activation data points that are projected onto a two-dimensional surface. The collection(s) of data points for which medians will be computed as described herein include all of the activations associated with a label, as shown and described in FIG. 5, and the activations associated with an individual cluster, as shown and described in FIG. 6. Although the analysis shown and described herein is directed at the median, this property should not be considered limiting. In one embodiment, an alternative geometric property may be exploited and employed for activation data point evaluation, and the median analyses should be considered non-limiting.

As shown, the variable $i_{Total}$ represents the quantity of labels within the activation data set subject to assessment for presence of poisoned data (502). A corresponding label counting variable, i, is initialized (504). For each label$_i$ in the activation data set, a median of all activations associated with the label$_i$ is computed (506). The variable $L_i$ is assigned (508) to represent the median of the activations for the label$_i$. Following step (508), the label counting variable i is incremented (510). It is then determined (512) if the median of all activation for each of the labels has been computed. A negative response to the determination at step (512) is followed by a return to step (506), and a positive response to the determination at step (512) concludes the process of computing the medians of the activations for each label$_i$. Accordingly, each label of the activations data set has an activation median computed for further analysis with respect to determining which of the clusters corresponds to poisoned data.

Figure 6:
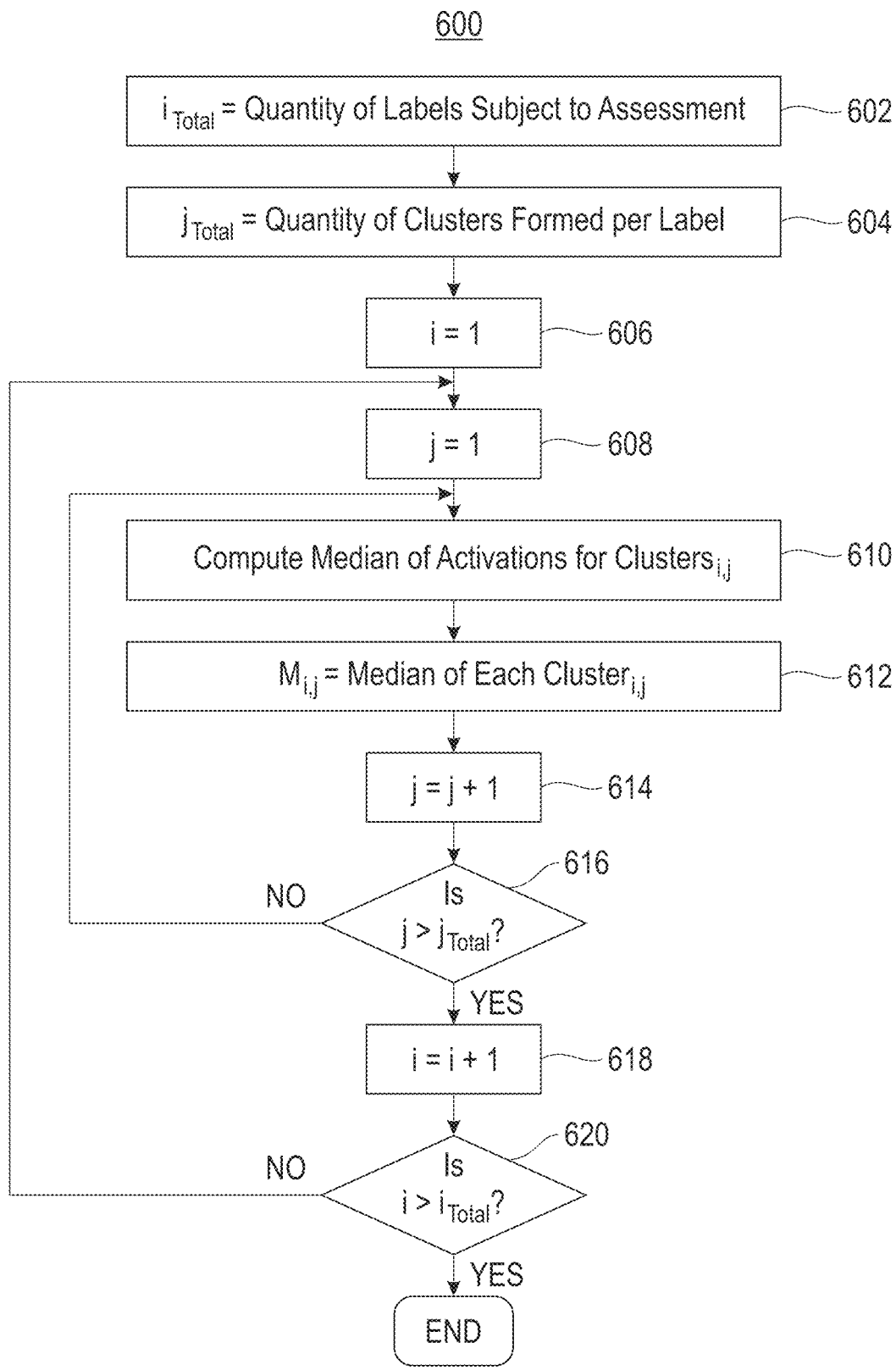
FIG. 6 depicts a flow chart illustrating a process for determining a median for activations in each cluster.

Referring to FIG. 6, a flow chart (600) is provided illustrating a process for determining a median for activations in each cluster. As shown, the variable $i_{Total}$ represents the quantity of labels within the data set subject to assessment for presence of poisoned data (602). Similarly, the variable $j_{Total}$ represents the quantity of clusters$_{i,j}$ formed for each label$_i$ within the data set subject to assessment for presence of poisoned data (604). The label counting variable, i, and the cluster counting variable, j, are initialized, (606) and (608), respectively. For each cluster$_{i,j}$ in each label$_i$ in the activations data set, a median of all activations associated with the cluster$_{i,j}$ is computed (610), and the variable $M_{i,j}$ is assigned to represent a median of the activations for the cluster, (612). Following step (612), the cluster counting variable j is incremented (614). It is then determined (616) if all of the clusters$_{i,j}$ have been subject to the activations median computations. A negative response to the determination at step (616) is followed by a return to step (610), and a positive response to the determination at step (616) is followed by an increment of the label counting variable i (618). It is then determined if all of the labels, in the activations data set have been subject to the activations median computations (620). A negative response to the determination at step (620) returns the process to step (608), and a positive response to the determination at step (620) concludes the process of computing the medians of the activations for each cluster$_{i,j}$. Accordingly, each cluster in each label of the activations data set has an activation median computed for further analysis with respect to determining which of the clusters corresponds to poisoned data.

Figure 7:
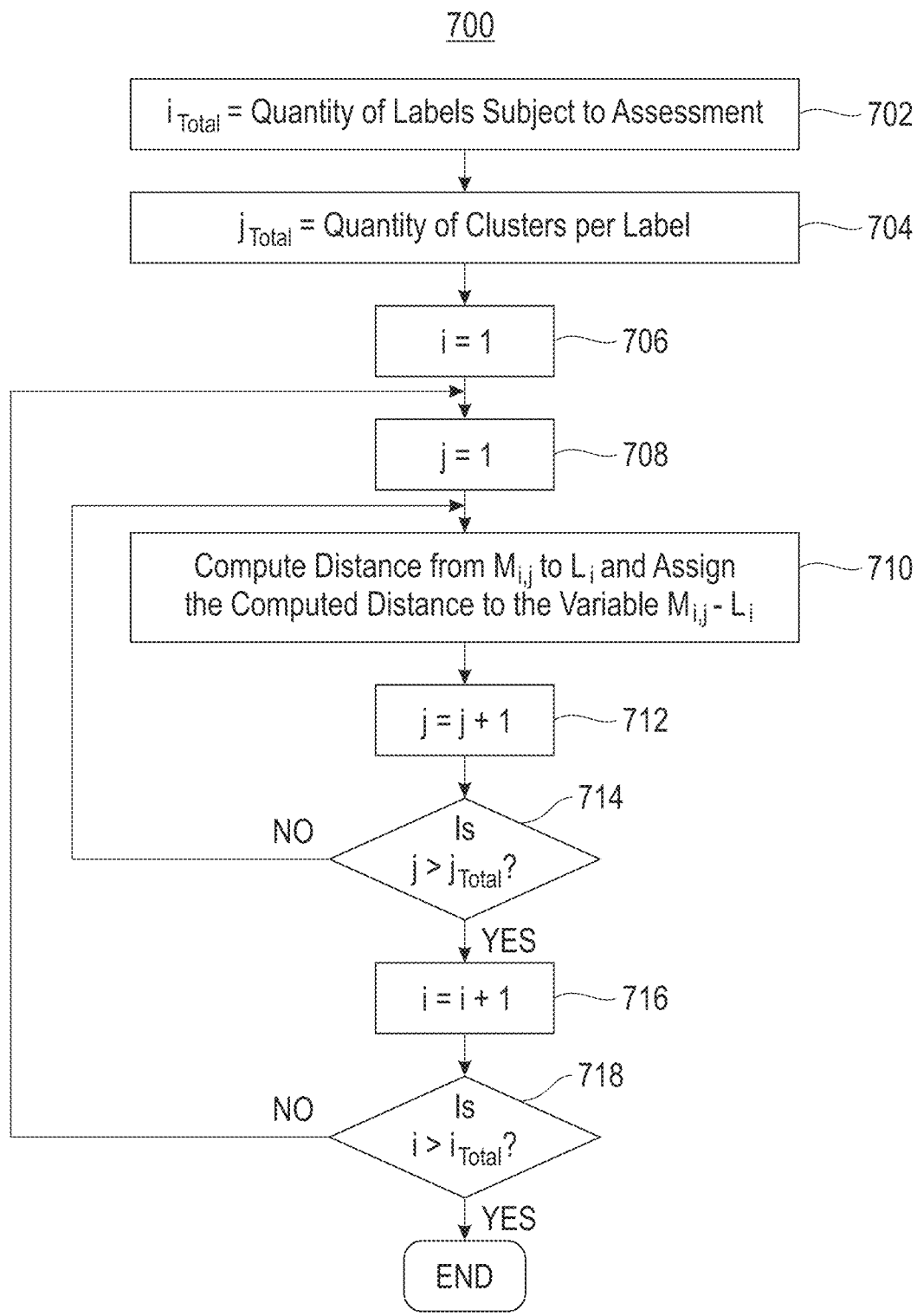
FIG. 7 depicts a flow chart illustrating a process for determining a distance from each cluster median to the median of the associated label.

Referring to FIG. 7, a flow chart (700) is provided illustrating a process for determining a distance from each cluster median, $M_{i,j}$ to the median, of the associated label, i.e., an intra-label distance. As shown, the variable $i_{Total}$ represents the quantity of labels within the activations data set subject to assessment for presence of poisoned data (702). Similarly, the variable $j_{Total}$ represents the quantity of clusters, formed for each label$_i$ (704). The label counting variable, i, and the cluster counting variable, j, are initialized at (706) and (708), respectively. For each cluster$_{i,j}$ in the activations data set, a distance between the median of each cluster, $M_{i,j}$, associated with a label$_i$ and the median, $L_i$, of that label$_i$ is computed, and the variable $M_{i,j}$-$L_i$ is assigned to represent the intra-label distance between the cluster medians and the associated label medians (710). Following the computation at step (710), the cluster counting variable j is incremented (712). It is then determined if all of the clusters$_{i,j}$ in label$_i$ have been subject to the cluster median to label median computations (714). A negative response to the determination at step (714) is followed by a return to step (710), and a positive response to the determination at step (714) is followed by an increment of the label counting variable i (716). It is then determined if all of the labels$_i$ in the activations data set have been subject to the cluster median-to-label median computations. A negative response to the determination at step (718) is followed by a return to step (708), and a positive response to the determination at step (718) concludes the process of computing the cluster median-to-label medians for each cluster$_{i,j}$ in each label$_i$. Accordingly, each cluster in each label of the activations data set has an intra-label distance computed between each cluster median and the associated label median for further analysis with respect to determining which of the clusters corresponds to poisoned data.

Figure 8:
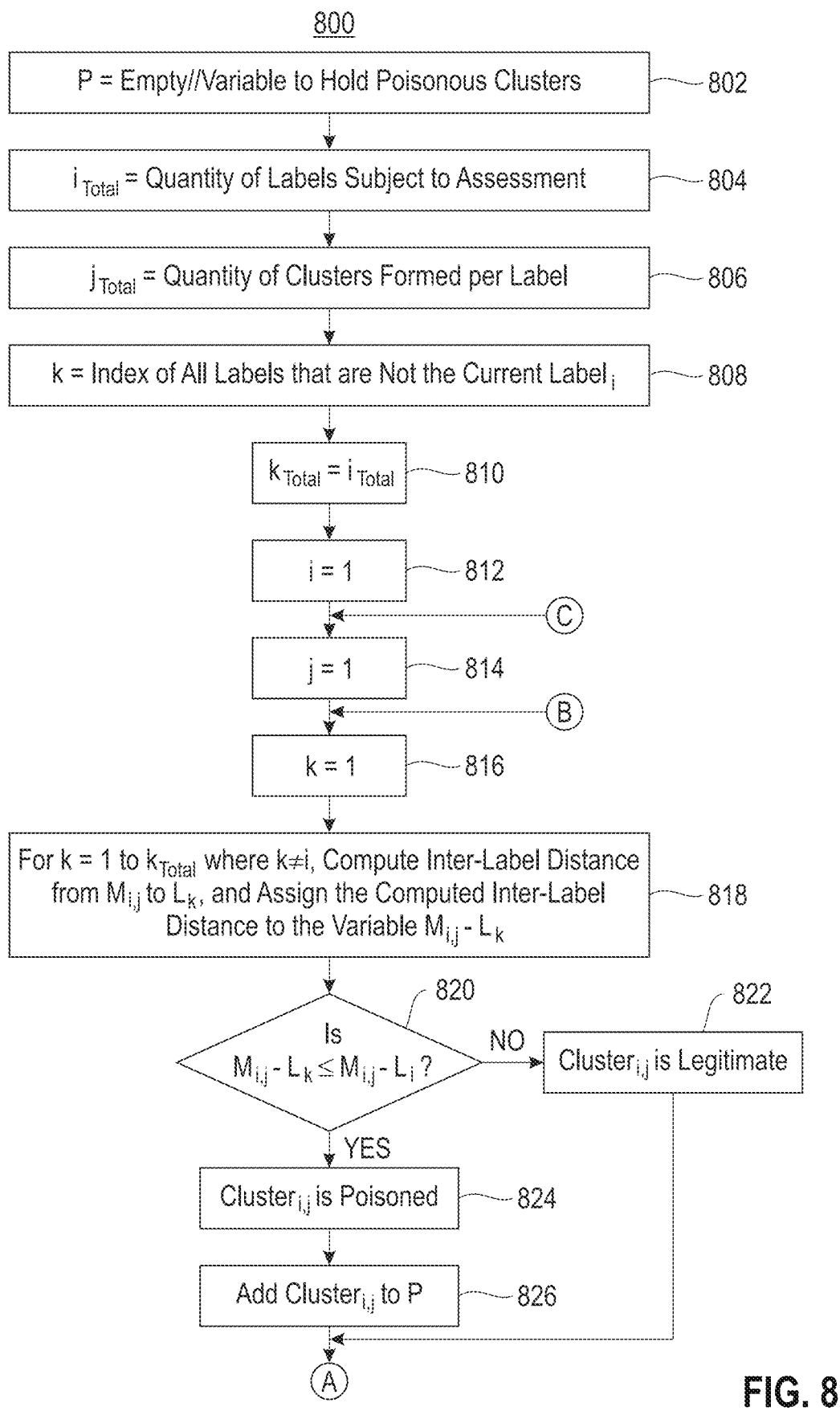
FIG. 8 depicts a flow chart illustrating a process for determining distances from each cluster median to the median of all other labels, and comparing these distances to the distances determined in FIG. 7.
Figure 8:
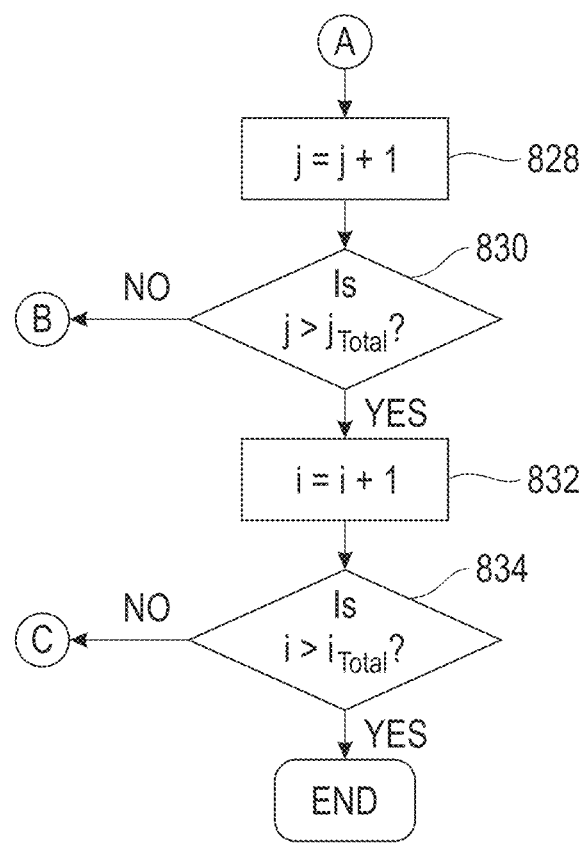

Referring to FIG. 8, a flow chart (800) is provided illustrating a process for determining inter-label distances from each cluster median to the median of all other labels, and comparing these inter-label distances to the intra-label distances $M_{i,j}$-$L_i$ determined in FIG. 7. As shown, a variable P is initialized as an empty variable to "hold" the identity of any known or suspected poisoned clusters (802). The variable $i_{Total}$ represents the quantity of labels within the activations data set subject to assessment for presence of poisoned data (804). Similarly, the variable $j_{Total}$ represents the quantity of clusters$_{i,j}$ formed for each label$_i$ within the activation data set subject to assessment for presence of poisoned data (806). Additionally, an index variable, k, representing all labels other than a current label$_i$ being analyzed is defined (808), where the value of the $i_{Total}$ is assigned to the variable $k_{Total}$ (810). The label counting variable, i, the cluster counting variable, j, and the label counting variable, k, are each initialized, as shown at steps (812), (814), (816), respectively. For each cluster$_{i,j}$, an inter-label distance between the median of each cluster ($M_{i,j}$) associated with a label$_i$ and the median ($L_k$) of a label$_k$ is computed (818). The requirement that k≠i ensures that only inter-label distances are computed to facilitate an effective comparison in step (820) with the appropriate intra-label distances computed in FIG. 7. The label counting variable k is incremented from k=1 to $k_{Total}$ with the exception of k≠i and the respective inter-label distances are computed. At step (818), the variable $M_{i,j}$-$L_k$ is assigned to represent the computed inter-label distances. Accordingly, the inter-label distances between the cluster medians and the label medians are determined for further analysis.

Once the inter-label distance ($M_{i,j}$-$L_k$) between the median ($M_{i,j}$) of each cluster$_{i,j}$ and the median of another label to which the cluster is not associated ($L_k$) is computed, as shown at step (818), that computed inter-label distance for $M_{i,j}$-$L_k$ is compared with the associated intra-label distance, $M_{i,j}$-$L_i$. More specifically, at step (820) it is determined if inter-label distance $M_{i,j}$-$L_k$ is less than or equal to the intra-label distance $M_{i,j}$-$L_i$. A negative response to the determination at step (820) indicates that the cluster$_{i,j}$ is "legitimate" (822) because the distance is indicative of the characteristics of the activations of the cluster$_{i,j}$ are more similar to the label$_i$ to which the cluster$_{i,j}$ belongs rather than any of the other labels$_k$ in the activations data set.

Referring to FIG. 4, a non-limiting example includes the cluster (402) where each activation data point (404) is associated with the numeral "7." The second cluster (406) is shown where the first portion (408) of the cluster (406) including the data points (410) has been poisoned by adding a dot in the numeral "6" and the data points (410) have been mislabeled to numeral "7". The second portion (412) of the second cluster (406) that includes the activations (414) as shown where each activation (414) thereof has the characteristic "6" and has not been poisoned or otherwise tampered. Data points (410) and (414) and their associated portions (408) and (412), respectively, are shown adjacently positioned.

FIG. 4 is shown with a first box (420) that includes the data points (404) that are legitimate numeral 7s and the data points (410) of the first portion (408) of the second cluster (406) that includes modified 6s that are mislabeled to appear as 7s. A dashed line separates the data points (404) and (410) for clarity. This grouping of data points (404) and (410) is referred to in the analysis discussed further herein as "Label$_7$." A second box (430) includes the data points (414) of the second portion (412) of the second cluster (406) that includes legitimate numeral 6s. This grouping of data points (414) is referred to in the analysis as "Label$_6$." Therefore, there are three distinct groupings of data points to be analyzed, i.e., the cluster (402) of legitimate 7s (404) (referred to as cluster$_{7,1}$), the portion (408) of the second cluster (406) that includes modified and mislabeled 6s (410) (referred to as cluster$_{7,2}$), and the portion (412) of the second cluster (406) that includes legitimate 6s (414) (referred to as cluster$_{6,1}$). Accordingly, while the legitimate 6s (414) and poisoned 6s (410) are grouped into the same cluster (406), this fact is not known until the method presented in this invention is run, thus the analysis treats portions (408) and (412) of cluster (406) as separate clusters.

Label$_7$ (420) includes a computed label median $L_7$ (422) inclusive of all of the activations (404) and (408) of cluster$_{7,1}$ (402) and cluster$_{7,2}$ (408), respectively. Cluster$_{7,1}$ (402) includes a computed cluster median $M_{7,1}$ (424) of activations (404). Cluster$_{7,2}$ (408) includes a computed cluster median $M_{7,2}$ (426) of activations (410). Cluster$_{6,1}$ (412) includes a computed cluster median $M_{6,1}$ (428). In one embodiment, label$_6$ (430) includes a computed label median $L_6$, where cluster median $M_{6,1}$ (428) and label median $L_6$ are coincident due to label$_6$ (430) having only one cluster.

In one embodiment, the intra-label distance between cluster median $M_{6,1}$ (428) and label median $L_6$ is computed and assigned to an intra-label distance $M_{6,1}$-$L_6$, where the distance $M_{6,1}$-$L_6$ is zero due to the coincidental relationship of the two medians $M_{6,1}$ (428) and $L_6$. Therefore, only median $M_{6,1}$ (428) is shown. The inter-label distance between cluster median $M_{6,1}$ (428) and label median $L_7$ (422) is computed and assigned (818) to inter-label distance $M_{6,1}$-$L_7$ (436). The result of determination (820) is that inter-label distance $M_{6,1}$-$L_7$ (436) is not less than or equal to intra-label distance $M_{6,1}$-$L_6$. It should be obvious that a comparison of intra-label distance $M_{6,1}$-$L_6$ (with a value of zero) with any other inter-label distance $M_{i,j}$-$L_k$ (where k≠6) will result in the determination (820) to be negative. Once each determination of $M_{6,1}$-$L_k$≤$M_{6,1}$-$L_6$ is determined to be negative, $cluster_{6,1}$ (412) is determined to be legitimate (822). This result coincides with the activations (414) of $cluster_{6,1}$ (412) having the characteristic "6" match the assigned $label_6$ (430). Accordingly, $cluster_{6,1}$ (412) is classified as legitimate (822), i.e., $cluster_{6,1}$ (412) is populated with legitimate activations.

The intra-label distance between cluster median $M_{7,1}$ (424) and label median $L_7$ (422) is computed and assigned to intra-label distance $M_{7,1}$-$L_7$ (438). The inter-label distance between cluster median $M_{7,1}$ (424) and label median $L_6$ is computed and assigned (818) to inter-label distance $M_{7,1}$-$L_6$ (440). The result of determination (820) is that inter-label distance $M_{7,1}$-$L_6$ (440) is not less than or equal to intra-label distance $M_{7,1}$-$L_7$ (438). Each value of inter-label distance $M_{7,1}$-$L_k$ computed for label variable k, where $k \neq 7$, is compared to intra-label distance $M_{7,1}$-$L_7$ (438) such that the intra-label distance $M_{7,1}$-$L_7$ (438) is compared to each computed inter-label distance $M_{7,1}$-$L_k$ for all remaining labels. Once each determination of $M_{7,1}$-$L_k \leq M_{7,1}$-$L_7$ is determined to be negative, $cluster_{7,1}$ (402) is determined to be legitimate (822). This result coincides with the activations (404) of $cluster_{7,1}$ (402) having the characteristic "7" match the assigned $label_7$ (420). Accordingly, $cluster_{7,1}$ (402) is classified as legitimate (822), i.e., $cluster_{7,1}$ (402) is populated with legitimate activations.

The intra-label distance between cluster median $M_{7,2}$ (426) and label median $L_7$ (422) is computed and assigned to distance $M_{7,2}$-$L_7$ (442). The inter-label distance between cluster median $M_{7,2}$ (426) and label median $L_6$ is computed and assigned (818) to intra-label distance $M_{7,2}$-$L_6$ (444). The result of determination (820) is that inter-label distance $M_{7,2}$-$L_6$ (444) is less than $M_{7,2}$-$L_7$ (442). Each value of inter-label distance $M_{7,2}$-$L_k$ computed for label variable k, where $k \neq 7$, is compared to intra-label distance $M_{7,2}$-$L_7$ (438) such that the intra-label distance $M_{7,1}$-$L_7$ (438) is compared to each computed inter-label distance $M_{7,1}$-$L_k$ for all remaining labels. Once each determination of $M_{7,2}$-$L_k \leq M_{7,2}$-$L_7$ is determined to be negative, $cluster_{7,2}$ (408) is classified as poisoned (824) at least due to the comparison of $M_{7,2}$-$L_6$ and $M_{7,2}$-$L_7$ (438). This result coincides with the activations (410) of $cluster_{7,2}$ (408) having the characteristic "6" not match the assigned $label_7$ (420). This result also coincides with the visual interpretation of $cluster_{7,2}$ (408) being physically closer to $cluster_{6,1}$ (412) than $cluster_{7,1}$ (402). Accordingly, $cluster_{7,2}$ (408) is classified as poisoned (824), i.e. $cluster_{7,2}$ (408) is determined to be populated with poisoned activations.

Referring again to FIG. 8, once it is determined that a $cluster_{i,j}$ is poisoned (824), the identity of $cluster_{i,j}$ is added to P (826). Following step (822) or step (826), the cluster counting variable j is incremented (828). It is then determined if all of the $clusters_{i,j}$ in $label_i$ have been subject to the comparison determination (830). A negative response to the determination at step (830) is followed by a return to step (816), and a positive response to the determination at step (830) is followed by an increment of the label counting variable, i, (832). It is then determined (834) if all of the labels, in the activations data set have been subject to the comparison determination (834). A negative response to the determination at step (834) is following by a return to step (814), and a positive response to the determination at step (834) concludes the process of determining for each $cluster_{i,j}$ in each $label_i$ whether the $cluster_{i,j}$ includes legitimate or poisoned activations therein. Accordingly, each cluster in each label of the activations data set undergoes a distance relationship evaluation with the inventory of labels in the data set, where if at least one inter-label distance between medians of the clusters and medians of the unassigned labels is less than or equal to intra-label distances between medians of the clusters and the median of the assigned label, the clusters will be classified as poisoned.

Once the poisoned clusters are classified as such, the labels associated with the data points in the clusters may be repaired or subject to a repair process to facilitate repair of the poisoned activation data. In one embodiment data clusters determined to include known poisoned data with the target labeling are re-labeled or subject to a re-labeling process with the correct, e.g. legitimate, source labels. The re-labeled data may be retained within the neural model. In one embodiment, the poisoned data will be removed from the activation data set and discarded. Accordingly, repairing within the neural model and removing poisoned data from the neural model are efficient and effective methods of resolving a backdoor from an adversarial entity.

It is understood in the art that an adversary may perform an unauthorized and undetected backdoor injection of poisoned data through any means known in the art of information technology security. In one embodiment, the mechanism for poisoning the source data includes adding a backdoor trigger to a portion of the source data and labeling that portion of the source data with the target label. For example, in a diverse sub-population of land vehicle road signs, a portion of stop signs in a source class will receive one or more unauthorized and, at least initially, undetected visual anomalies embedded within the image of a particular training data point which will cause the image to be misclassified as another classification of street signs. For example, in one embodiment, a special sticker may be added to the image of a stop sign that will cause the neural model to misinterpret and misclassify the stop sign in the source class as a target classification with an associated incorrect label of a speed limit sign. In one embodiment, the backdoor trigger is a pattern of inverted pixels somewhere on the images. While a number of the exemplary embodiments described herein include visual data, textual data may be poisoned in a similar manner with one or more textual backdoor triggers. Accordingly, the untrusted training data set may include at least a first portion of the training data set with legitimate labels representative of the associated source class and at least one second portion of the training data set with misclassified labels. In one embodiment, in a text-based classification scheme, the backdoor is inserted into a text-corpus by adding one or more words into some of the training data while mislabeling it to the target label. In other embodiments, where the classification task is different, e.g., a sound track classification task, the backdoor is inherent to that medium.

Embodiments shown and described herein may be in the form of a computer system for use with an intelligent computer platform for providing orchestration of activities across one or more domains to minimize risk. Aspects of the tools (152)-(160) and their associated functionality may be embodied in a computer system/server in a single location, or in one embodiment, may be configured in a cloud based system sharing computing resources. With references to FIG. 9, a block diagram (900) is provided illustrating an example of a computer system/server (902), hereinafter referred to as a host (902) in communication with a cloud based support system, to implement the system, tools, and processes described above with respect to FIGS. 1-8. Host (902) is operational with numerous other general purpose or special purpose computing system environments or configurations. Examples of well-known computing systems, environments, and/or configurations that may be suitable for use with host (902) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (902) may be described in the general context of computer system-executable instructions, such as program modules, being executed by a computer system. Generally, program modules may include routines, programs, objects, components, logic, data structures, and so on that perform particular tasks or implement particular abstract data types. Host (902) may be practiced in distributed cloud computing environments where tasks are performed by remote processing devices that are linked through a communications network. In a distributed cloud computing environment, program modules may be located in both local and remote computer system storage media including memory storage devices.

Figure 9:
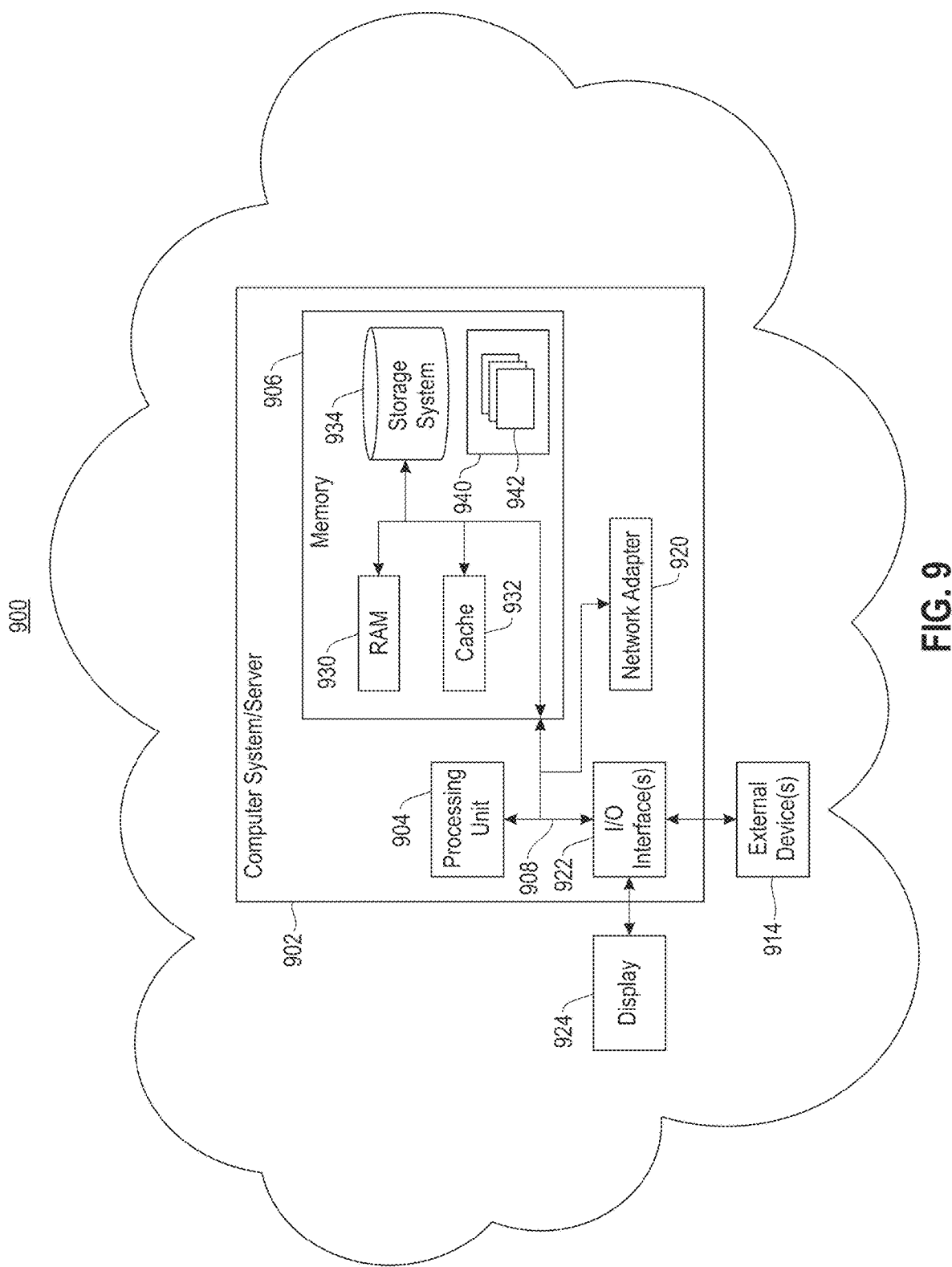
FIG. 9 depicts a block diagram illustrating an example of a computer system/server of a cloud based support system, to implement the system and processes described above with respect to FIGS. 1-8.

As shown in FIG. 9, host (902) is shown in the form of a general-purpose computing device. The components of host (902) may include, but are not limited to, one or more processors or processing units (604), e.g. hardware processors, a system memory (906), and a bus (908) that couples various system components including system memory (906) to processor (904). Bus (908) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (902) typically includes a variety of computer system readable media. Such media may be any available media that is accessible by host (902) and it includes both volatile and non-volatile media, removable and non-removable media.

Memory (906) can include computer system readable media in the form of volatile memory, such as random access memory (RAM) (630) and/or cache memory (932). By way of example only, storage system (934) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (940), having a set (at least one) of program modules (942), may be stored in memory (906) by way of example, and not limitation, as well as an operating system, one or more application programs, other program modules, and program data. Each of the operating systems, one or more application programs, other program modules, and program data or some combination thereof, may include an implementation of a networking environment. Program modules (942) generally carry out the functions and/or methodologies of embodiments to dynamically process an untrusted training data set to identify potentially poisoned data and remove the identified data from a corresponding neural model. For example, the set of program modules (942) may include the tools (152)-(160) as described in FIG. 1.

Host (902) may also communicate with one or more external devices (914), such as a keyboard, a pointing device, etc.; a display (924); one or more devices that enable a user to interact with host (902); and/or any devices (e.g., network card, modem, etc.) that enable host (902) to communicate with one or more other computing devices. Such communication can occur via Input/Output (I/O) interface(s) (922). Still yet, host (902) can communicate with one or more networks such as a local area network (LAN), a general wide area network (WAN), and/or a public network (e.g., the Internet) via network adapter (920). As depicted, network adapter (920) communicates with the other components of host (902) via bus (908). In one embodiment, a plurality of nodes of a distributed file system (not shown) is in communication with the host (902) via the I/O interface (922) or via the network adapter (920). It should be understood that although not shown, other hardware and/or software components could be used in conjunction with host (902). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (906), including RAM (930), cache (932), and storage system (934), such as a removable storage drive and a hard disk installed in a hard disk drive.

Computer programs (also called computer control logic) are stored in memory (906). Computer programs may also be received via a communication interface, such as network adapter (920). Such computer programs, when run, enable the computer system to perform the features of the present embodiments as discussed herein. In particular, the computer programs, when run, enable the processing unit (904) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (902) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
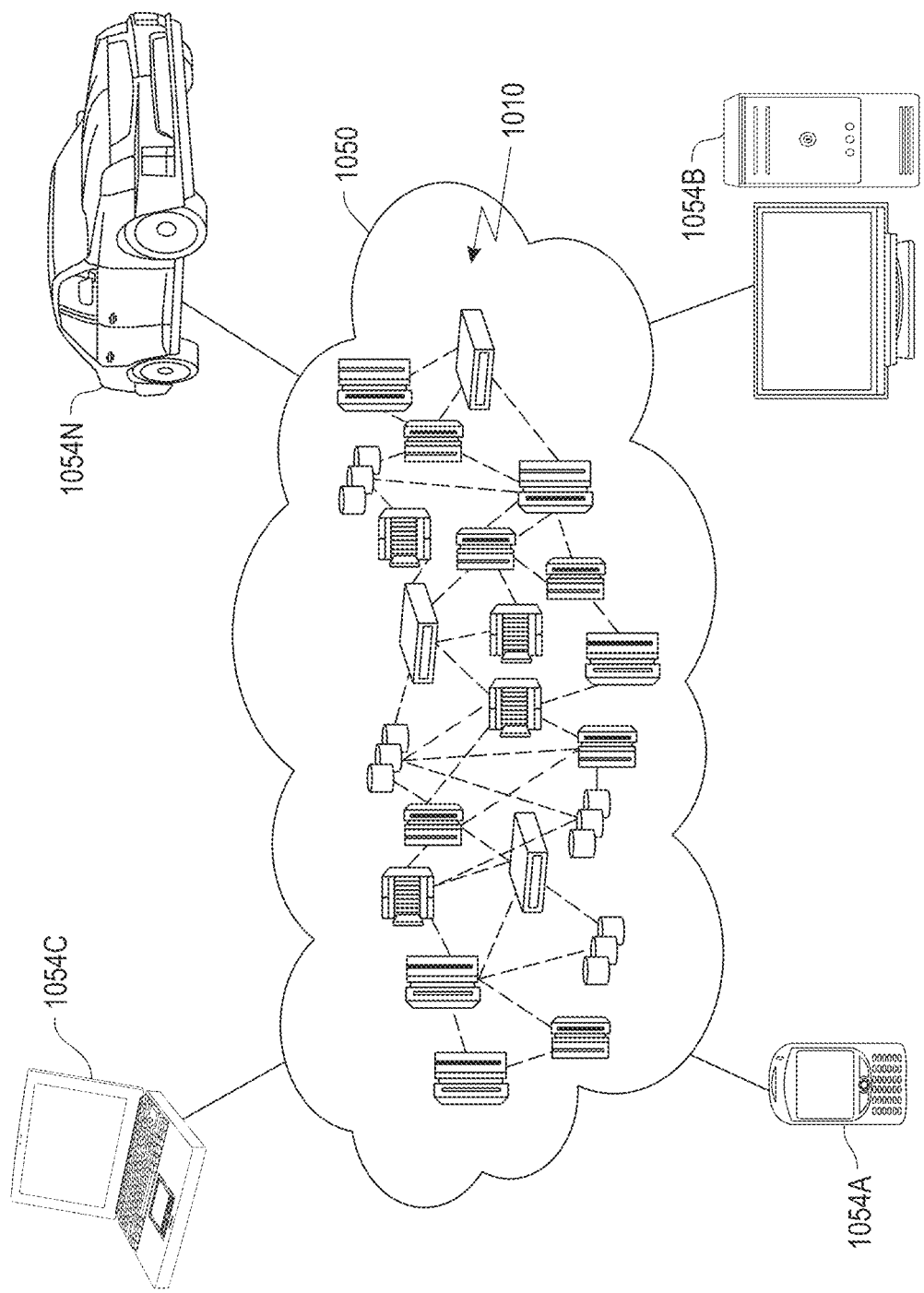
FIG. 10 depicts a block diagram illustrating a cloud computer environment.

Referring now to FIG. 10, an illustrative cloud computing network (1000). As shown, cloud computing network (1000) includes a cloud computing environment (1050) having one or more cloud computing nodes (1010) with which local computing devices used by cloud consumers may communicate. Examples of these local computing devices include, but are not limited to, personal digital assistant (PDA) or cellular telephone (1054A), desktop computer (1054B), laptop computer (1054C), and/or automobile computer system (1054N). Individual nodes within nodes (1010) may further communicate with one another. They may be grouped (not shown) physically or virtually, in one or more networks, such as Private, Community, Public, or Hybrid clouds as described hereinabove, or a combination thereof. This allows cloud computing environment (1000) to offer infrastructure, platforms and/or software as services for which a cloud consumer does not need to maintain resources on a local computing device. It is understood that the types of computing devices (1054A-N) shown in FIG. 10 are intended to be illustrative only and that the cloud computing environment (1050) can communicate with any type of computerized device over any type of network and/or network addressable connection (e.g., using a web browser).

Figure 11:
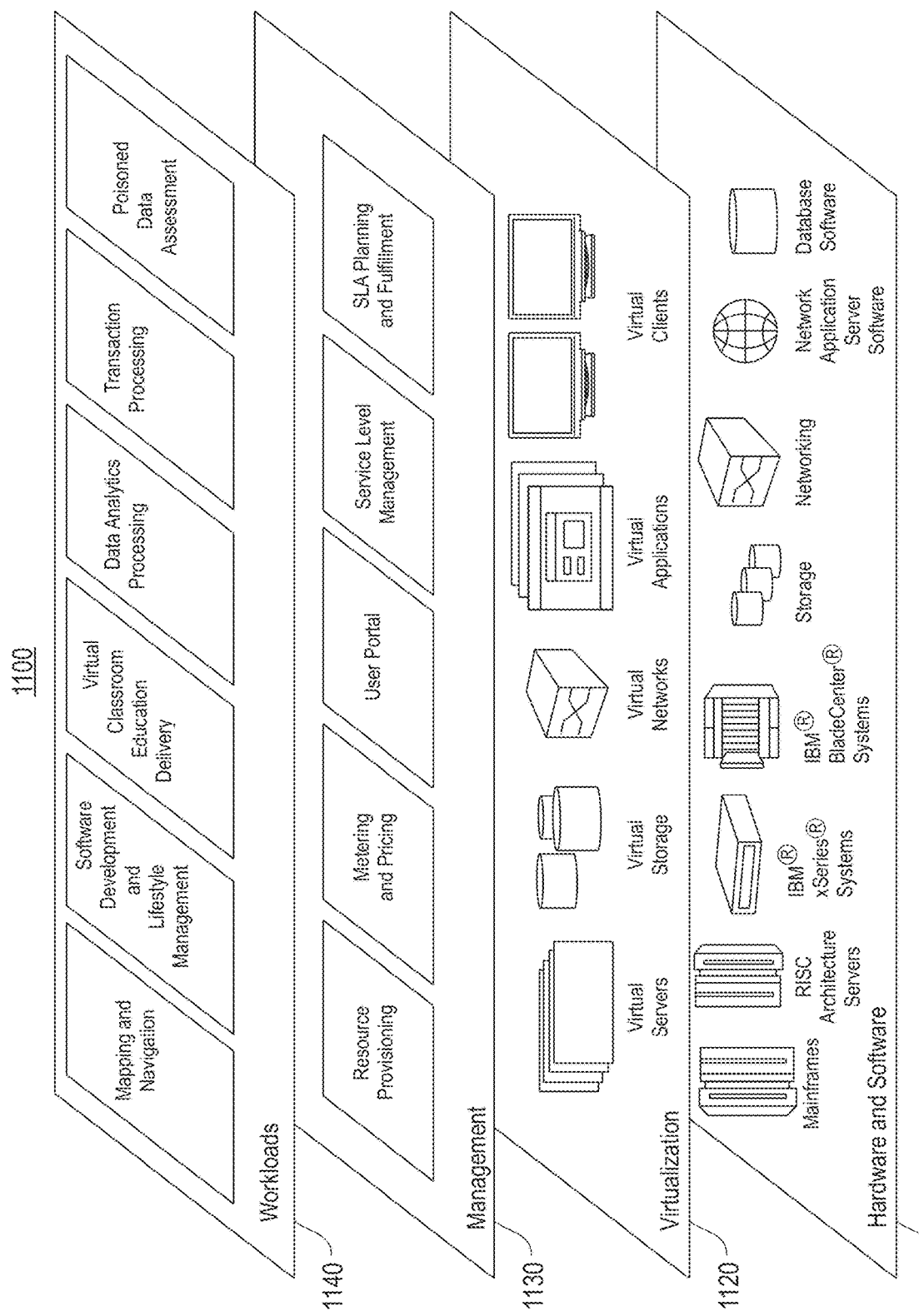
FIG. 11 depicts a block diagram illustrating a set of functional abstraction model layers provided by the cloud computing environment.

Referring now to FIG. 11, a set of functional abstraction layers (1100) provided by the cloud computing network of FIG. 10 is shown. It should be understood in advance that the components, layers, and functions shown in FIG. 11 are intended to be illustrative only, and the embodiments are not limited thereto. As depicted, the following layers and corresponding functions are provided: hardware and software layer (1110), virtualization layer (1120), management layer (1130), and workload layer (1140).

The hardware and software layer (1110) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1120) provides an abstraction layer from which the following examples of virtual entities may be provided: virtual servers; virtual storage; virtual networks, including virtual private networks; virtual applications and operating systems; and virtual clients.

In one example, management layer (1130) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1140) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and poisoned data assessment.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to find and distinguish poisoned activation data from legitimate data within a neural network trained with poisonous data.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
  a processor operatively coupled to memory;
  an artificial intelligence (AI) platform, in communication with the processing, having machine learning (ML) tools to process an untrusted training data set, the tools comprising:
    a training manager to train a neural model with the untrusted data set;
    a ML manager, operatively coupled to the training manager, to classify each data point in the untrusted data set using the trained neural model, and to retain activations of one or more designated layers in the trained neural model;
    a cluster manager, operatively coupled to the ML manager, to apply a clustering technique on the retained activations for each label, and for each cluster to assess integrity of data in the cluster, including the cluster manager to:
      determine a first distance between a first median and a second median, the first median representing intra-cluster first activations for a first cluster, the first cluster representing a first label, and the second median representing first activations for the first label, the first activations defining a first data set associated with the first label; and
      determine a second distance between the first median and a third median representing second activations for a second label, the second activations defining a second data set associated with the second label, the second label being different from the first label;
    a classification manager, operatively coupled to the cluster manager, the classification manager to assign a poisoned classification or a legitimate classification to the assessed cluster, the classification corresponding to the integrity assessment; and
    a repair manager, operatively coupled to the classification manager, the repair manager to selectively remediate one or more clusters classified as poisoned.

2. The system of claim 1, wherein integrity assessment of the classified data further comprises the classification manager to assign the poisoned classification to the first cluster when the second distance is less than or equal to the first distance.

3. The system of claim 2, further comprising the repair manager to perform a remediation action on each cluster classified as poisoned, the remediation action including repair the cluster or remove the cluster.

4. The system of claim 2, wherein integrity assessment of the classified data further comprises the classification manager to:
  determine the first label has a first characteristic;
  determine the second label has a second characteristic different from the first characteristic; and
  wherein the poisoned cluster has a cluster characteristic similar to the second characteristic and dissimilar from the first characteristic.

5. The system of claim 1, wherein integrity assessment of the classified data further comprises the classification manager to assign a legitimate classification to the first cluster when the second distance is greater than the first distance.

6. The system of claim 5, wherein integrity assessment of the classified data further comprises the classification manager to:
  determine the first label, associated with the legitimate cluster, has a first characteristic;
  determine the second label has a second characteristic different from the first characteristic; and
  wherein the legitimate cluster has a cluster characteristic similar to the first characteristic and dissimilar from the second characteristic.

7. A computer program product to utilize machine learning to process an untrusted training data set, the computer program product comprising:

a computer readable storage medium having program code embodied therewith, the program code executable by a processor to:
  train a neural model with the untrusted training data set;
  classify each data point in the untrusted training data set using the trained neural model, and retain activations of one or more designated layers in the trained neural model;
  apply a clustering technique on the retained activations for each label, and for each cluster assess integrity of data in the cluster, including program code to:
    determine a first distance between a first median and a second median, the first median represents intra-cluster first activations for a first cluster, the first cluster represents a first label, and the second median represents first activations for the first label, the first activations define a first data set associated with the first label; and
    determine a second distance between the first median and a third median, the third median represents second activations for a second label, the second activations define a second data set associated with the second label, the second label being different from the first label;
  compare the first and second distances, and classify the first cluster as a poisoned classification or a legitimate classification responsive to the comparison; and
  selectively remediate one or more clusters classified as poisoned.

8. The computer program product of claim 7, wherein integrity assessment of the classified data further comprises program code executable by the processor to assign the poisoned classification to the first cluster when the second distance is less than or equal to the first distance.

9. The computer program product of claim 8, further comprising program code executable by the processor to perform a remediation action, the remediation action including repair the cluster or remove the cluster.

10. The computer program product of claim 8, further comprising program code executable by the processor to:
  determine the first label has a first characteristic;
  determine the second label has a second characteristic different from the first characteristic; and
  wherein the poisoned cluster has a cluster characteristic similar to the second characteristic and dissimilar from the first characteristic.

11. The computer program product of claim 7 further comprising program code executable by the processor to assign a legitimate classification to the first cluster when the second distance is greater than the first distance.

12. The computer program product of claim 7 further comprising program code executable by the processor to:
  determine the first label, associated with the legitimate cluster, has a first characteristic;
  determine the second label has a second characteristic different from the first characteristic; and
  wherein the legitimate cluster has a cluster characteristic similar to the first characteristic and dissimilar from the second characteristic.

13. The computer program product of claim 7, wherein the classification corresponds to the integrity assessment.

14. A method comprising:
  receiving, by a neural network, an untrusted training data set, each data point of the untrusted data set having a label;
  training a neural model using the untrusted data set;
  classifying each data point in the untrusted data set using the trained neural model, and retaining activations of one or more designated layers in the trained neural model;
  applying a clustering technique on the retained activations for each label;
  for each cluster, assessing integrity of data associated with the cluster including:
    determining a first distance between a first median and a second median, the first median representing intra-cluster first activations for a first cluster, the first cluster representing a first label, and the second median representing first activations for the first label, the first activations defining a first data set associated with the first label; and
    determining a second distance between the first median and a third median representing second activations for a second label, the second activations defining a second data set associated with the second label, the second label being different from the first label;
  comparing the first and second distances, and classifying the first cluster as a poisoned classification or a legitimate classification responsive to the comparison; and
  selectively remediating one or more clusters classified as poisoned.

15. The method of claim 14, further comprising assigning the poisoned classification to the first cluster when the second distance is less than or equal to the first distance.

16. The method of claim 15, wherein the poisoned cluster is subject to a repair remediation action or a removal remediation action.

17. The method of claim 15, wherein:
  the first label has a first characteristic;
  the second label has a second characteristic different from the first characteristic; and
  wherein the poisoned cluster has a cluster characteristic similar to the second characteristic and dissimilar from the first characteristic.

18. The method of claim 14, further comprising assigning a legitimate classification to the first cluster when the second distance is greater than the first distance.

19. The method of claim 18, wherein the first cluster is classified legitimate, and
  the first label, associated with the legitimate cluster, has a first characteristic;
  the second label has a second characteristic different from the first characteristic; and
  wherein the legitimate cluster has a cluster characteristic similar to the first characteristic and dissimilar from the second characteristic.

20. The method of claim 14, wherein the classifying corresponds to the integrity assessment.

* * * * *